Sept. 6, 1949.    A. J. CAYAS    2,481,199

DEVICE FOR THE DISPOSAL OF SNOW AND ICE

Filed Nov. 21, 1946

A. J. Cayas
Inventor
by
Attorney

Patented Sept. 6, 1949

2,481,199

UNITED STATES PATENT OFFICE 2,481,199

DEVICE FOR THE DISPOSAL OF SNOW AND ICE

Alex J. Cayas, Glendale, Calif.

Application November 21, 1946, Serial No. 711,360

2 Claims. (Cl. 126—343.5)

1

This invention relates to a truck body adapted for the disposal of snow and/or ice, and has for its principal object the provision of a structure which will make unnecessary the hauling of snow and ice from city streets or other thoroughfares to a relatively remote point for dumping, the snow and ice which is charged into the structure being transformed rapidly into water which can be drained immediately to gutters, sewers and the like, thereby reducing the total number of trucks required and creating a relatively great saving in time and expense to a city.

With these and other objects in view the invention resides in the novel details of construction and combinations of parts as will be disclosed more fully hereinafter and particularly covered by the claims.

Referring to the accompanying drawings forming a part of this specification and in which like numerals designate like parts in all the views—

Figure 1:
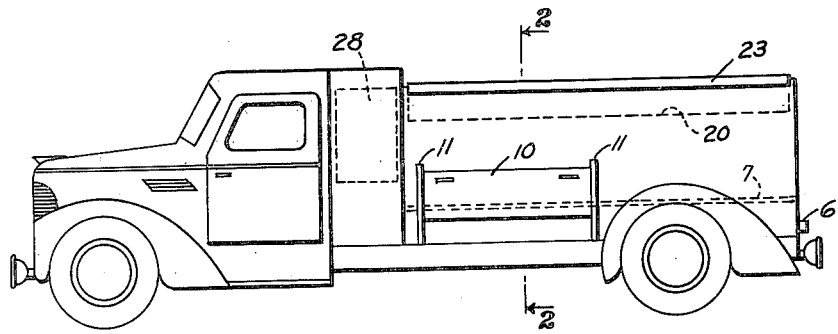
Figure 2:
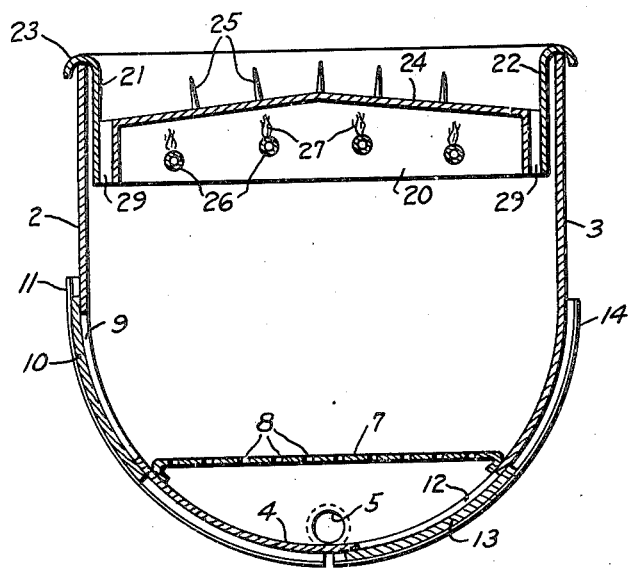

Fig. 1 is a side elevational view of an automobile truck which has been adapted for the purposes of this invention; and Fig. 2 is a vertical transverse sectional view of the truck body, taken as on the line 2—2 of Fig. 1 and looking in the direction of the arrows.

According to this invention, any truck body may be used so long as it has interconnected side and bottom wall construction of such formation as to provide generically a tank or receptacle having an open top and fitted with a liquid drain in the lower portion thereof. One such vehicle is illustrated for the purpose of example only, and wherein the vertical side walls of the truck body, indicated by the numerals 2 and 3, are extended downwardly in a curvilinear manner to form the rounded bottom wall 4, and the rear end wall of said body is provided with a drain opening 5 adjacent the bottom wall, which drain opening is provided exteriorly of the body or tank with a valved hose connection indicated at 6. Adjacent the bottom of the body there is provided a substantially horizontal plate 7 having a plurality of perforations 8 therethrough, and in the side wall 2 above said plate there is provided an access door or opening 9 covered by a sliding cover 10 operating in suitable guides 11, and in the bottom wall 4 below said plate 7 there may be provided a discharge door or opening 12 covered by a sliding cover 13 operating in suitable guides such as 14.

Spanning the open top of the tank and fitting closely within the side walls 2 and 3 thereof, is a readily removable box-like heater or burner assembly generally identified by the numeral 20, which assembly comprises opposite side walls 21

2 and 22 the upper extreme edges of which are outwardly directed to form hook portions as indicated at 23 overhanging and/or engaging the upper edges of the side walls 2 and 3 of the tank and by means of which the burner assembly is suspended in said truck body. Fitted between the walls of the burner assembly is an elevated floor comprising a metal plate 24 preferably pitched from its longitudinal median portion downwardly as indicated in the drawings toward the side walls 21 and 22.

This floor is provided with a plurality of spaced sharply pointed spikes 25 extending upwardly therefrom, and a plurality of burner pipes 26 are suitably supported to be disposed below said floor, which pipes are apertured in their upper areas as well understood for egress of a liquid or gaseous fuel to make possible flames indicated at 27 for heating said floor. A suitable container is indicated at 28 for supplying a gaseous or liquid fuel to the burner 26 (valved pipe connections not shown for simplicity of illustration), and adjacent the side walls 21 and 22 of the burner assembly there are provided conduits such as 29 which, being at the lowest area of the floor 24, provide drainage for the melted snow and/or ice from the heated floor, said conduits conveying the melted snow and/or ice as water to the lower region of the tank, in which the water or resultant liquid may be retained if not permitted to escape through the drain 5.

The purpose of the spikes 25 is to break up chunks of snow and/or ice as they are shovelled, dumped or otherwise projected and/or deposited onto the floor 24, thereby hastening the melting action of the burner assembly. The sliding covers 10 and 13 may operate curvilinearly of the rounded truck body as indicated in the drawings, or they may operate in a longitudinal manner i. e. from left to right, of said truck body.

In the operation of this truck body as a snow scavenger, the snow is loaded by mechanical or manual means so as to be deposited upon the burner plate or floor 24, big chunks and/or partially or solidly frozen chunks striking the spikes 25 and being shattered thereby into smaller pieces. Heat from the burner pipes 26 is conducted by the floor plate 24 to the snow and melts the same, the resulting water flowing through the conduits 29 into the lower portion of the tank for escape through the drain 5. Any unmelted snow passing through said conduits will be caught by the perforated metal plate 7 and either held thereby for ultimate removal through the door 9, or subsequently become melted and passed as water therethrough to reach said drain; foreign matter such as stones, twigs etc. will also be caught by said perforated plate 7 to be ultimately removed through said door 9. A hose may be attached to the valved drain coupling 6 for diverting the resultant water to any desired point such as a sewer, culvert or other desirable place of disposal.

Snow disposal machines are known, but they have comprised cumbersome and expensive structures due to their complicated mechanisms. This invention is not to be confused therewith since it embodies a simple structure in the nature of a heater or burner which can be readily applied to and detached from an ordinary truck body whereby said truck body may be used alternatively for other purposes including the hauling of ashes and garbage. The invention therefore contemplates such a removable heater or burner which is fitted within the walls forming the tank portion of said truck body and suspended from the top edges of said walls, or a burner assembly or snow melter for use with a stationary tank or even with a drain or catch basin connected to a sewer, as well as said heater or burner in combination with the truck body tank including the perforated plate 7 and the liquid drain in the lower region of said tank.

It is obvious that those skilled in the art may vary the details of construction and arrangements of parts without departing from the spirit of this invention, therefore it is desired not to be limited to the exact foregoing disclosure except as may be required by the claims.

What is claimed is:

1. A snow melting assembly comprising substantially vertical side walls the upper extremities of which are provided with hook-like means for ready engagement with and disengagement from a supporting structure for the assembly, said assembly further comprising an imperforate floor for receiving the snow thereon, said floor having heating means therebeneath for melting the received snow, said floor having drain openings at its perimeter for the escape of the resultant liquid.

2. A snow melting assembly comprising opposite substantially vertical side walls the upper extremities of which are outwardly directed forming hook-like means for ready engagement with and disengagement from a supporting structure for the assembly, said assembly further comprising an imperforate floor for receiving the snow thereon, said floor having heating means therebeneath for melting the received snow, said floor having drain openings at its perimeter for the escape of the resultant liquid, said side walls being extended downwardly below said floor whereby to encompass and protect said heating means from the resultant liquid draining from said floor.

ALEX J. CAYAS.

REFERENCES CITED

The following references are of record in the file of this patent:

UNITED STATES PATENTS

| Number | Name | Date |
| --- | --- | --- |
| 207,970 | Lederer | Sept. 10, 1878 |
| 559,217 | Ripley | Apr. 28, 1896 |
| 614,193 | Boorman et al. | Nov. 15, 1898 |
| 634,021 | Palmer | Oct. 3, 1899 |
| 729,266 | Brentzinger | May 26, 1902 |
| 830,305 | Cruise | Sept. 4, 1906 |
| 950,413 | Stedman et al. | Feb. 22, 1910 |
| 994,579 | Eberstaller | June 6, 1911 |
| 1,055,506 | Angebrandt | Mar. 11, 1913 |
| 1,073,427 | Lapsley | Sept. 16, 1913 |
| 1,289,172 | Hobson | Dec. 31, 1918 |
| 1,386,137 | Squire | Aug. 2, 1921 |
| 1,568,414 | Pfadt | Jan. 5, 1926 |
| 1,728,525 | Browne et al. | Sept. 17, 1929 |